United States Patent [19]

Jandrasi

[11] 4,316,483

[45] Feb. 23, 1982

[54] VALVE HAVING WEAR-PRONE PARTS REMOVABLE THROUGH BONNET AREA

[75] Inventor: Frank J. Jandrasi, Houston, Tex.

[73] Assignee: Tapco International, Inc., Houston, Tex.

[21] Appl. No.: 65,019

[22] Filed: Aug. 9, 1979

[51] Int. Cl.³ ............................................. F16K 43/00
[52] U.S. Cl. .................................. 137/315; 137/375; 137/454.6; 251/327; 251/328; 251/329
[58] Field of Search ...................... 137/315, 375, 454.6; 251/326, 327, 328, 329, 124, 3, 368

[56] References Cited

U.S. PATENT DOCUMENTS

| | | | |
|---|---|---|---|
| 1,133,650 | 3/1915 | Lentz | 251/124 |
| 2,815,187 | 12/1957 | Hamer | 251/328 |
| 2,905,192 | 9/1959 | Velan | 137/315 |
| 3,078,871 | 2/1963 | Magos | 251/329 |
| 3,111,137 | 11/1963 | Carlin | 137/315 |
| 3,282,559 | 11/1966 | Bredtschneider | 251/327 |
| 3,614,061 | 10/1971 | Fitzpatrick | 251/328 |
| 3,726,306 | 4/1973 | Purvis | 137/375 |
| 3,964,507 | 6/1976 | Jandrasi et al. | 137/375 |
| 3,993,285 | 11/1976 | Conley | 251/328 |

FOREIGN PATENT DOCUMENTS 1094888 3/1953 France ............................. 251/328

Primary Examiner—Martin P. Schwadron
Assistant Examiner—G. L. Walton
Attorney, Agent, or Firm—Fulbright & Jaworski

[57] ABSTRACT

A valve is disclosed in which the wear-prone parts comprised of the valve, guides and valve seat are readily and easily removed through the bonnet area. The guides are maintained in position in the valve body by engagement with a stop and by securing the bonnet to the body without the requirement of being bolted to the body. Other features and details are disclosed.

12 Claims, 9 Drawing Figures

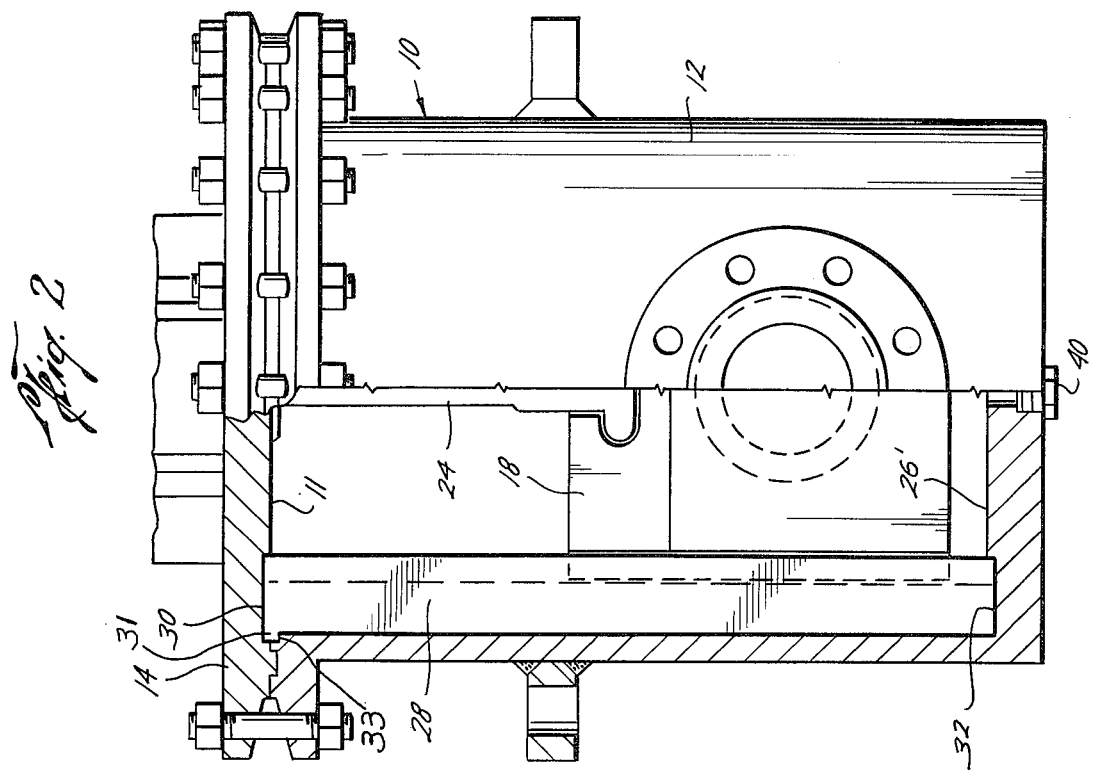
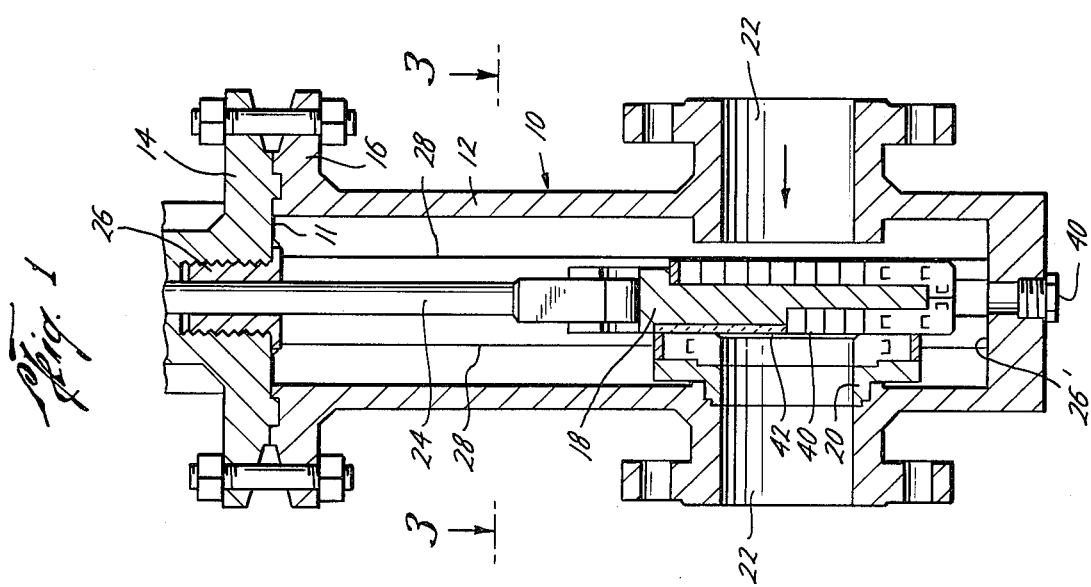

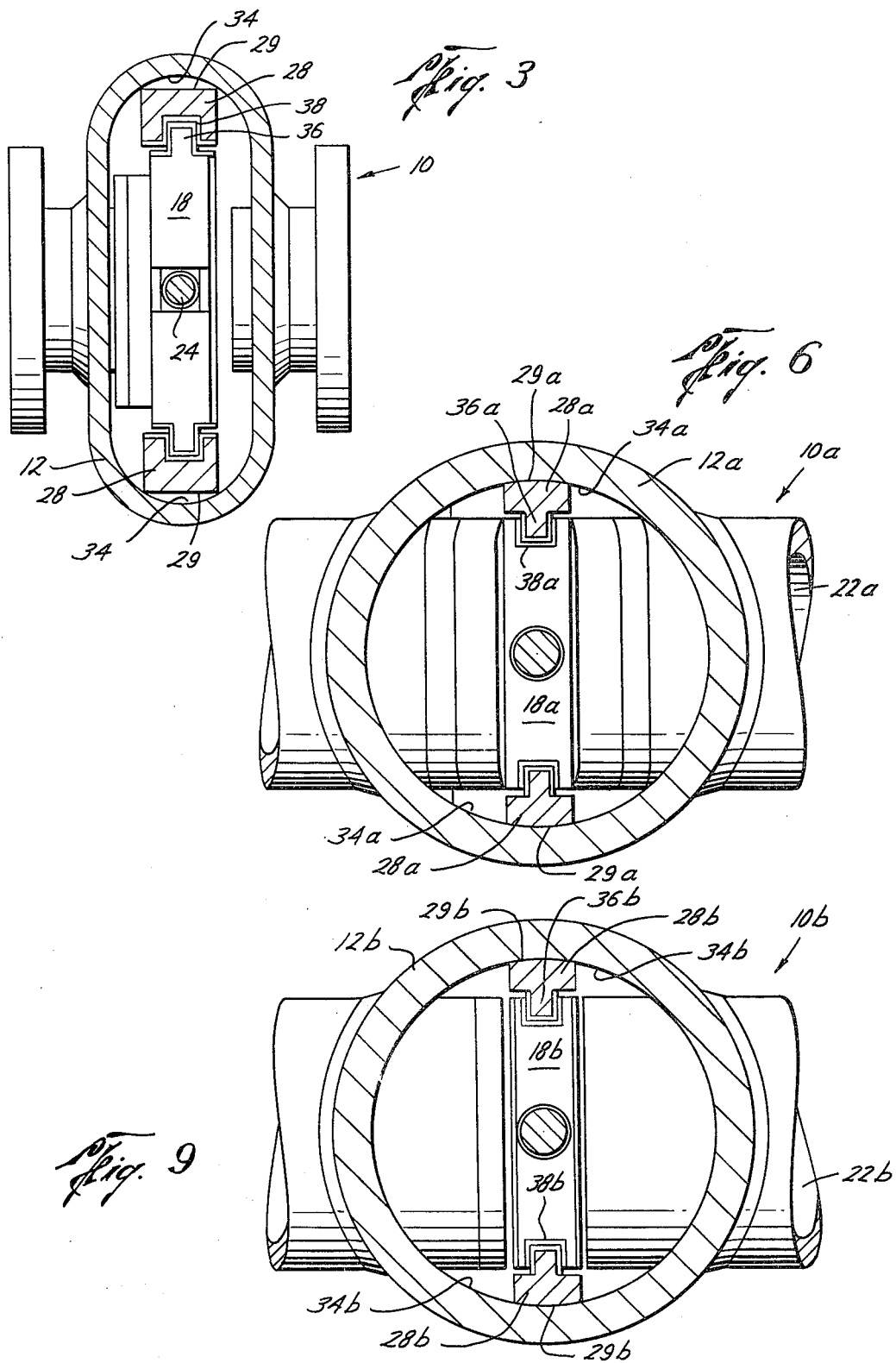

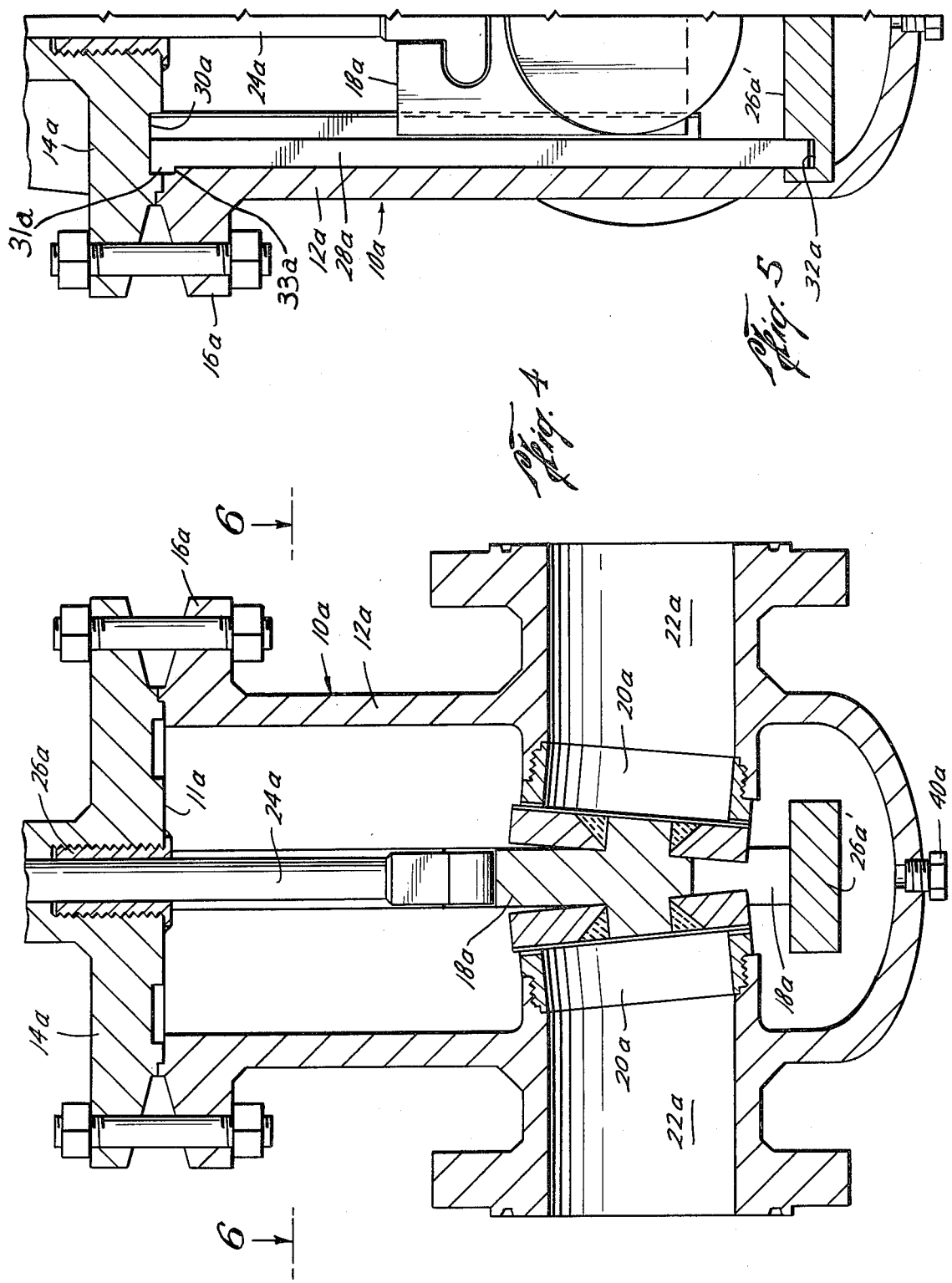

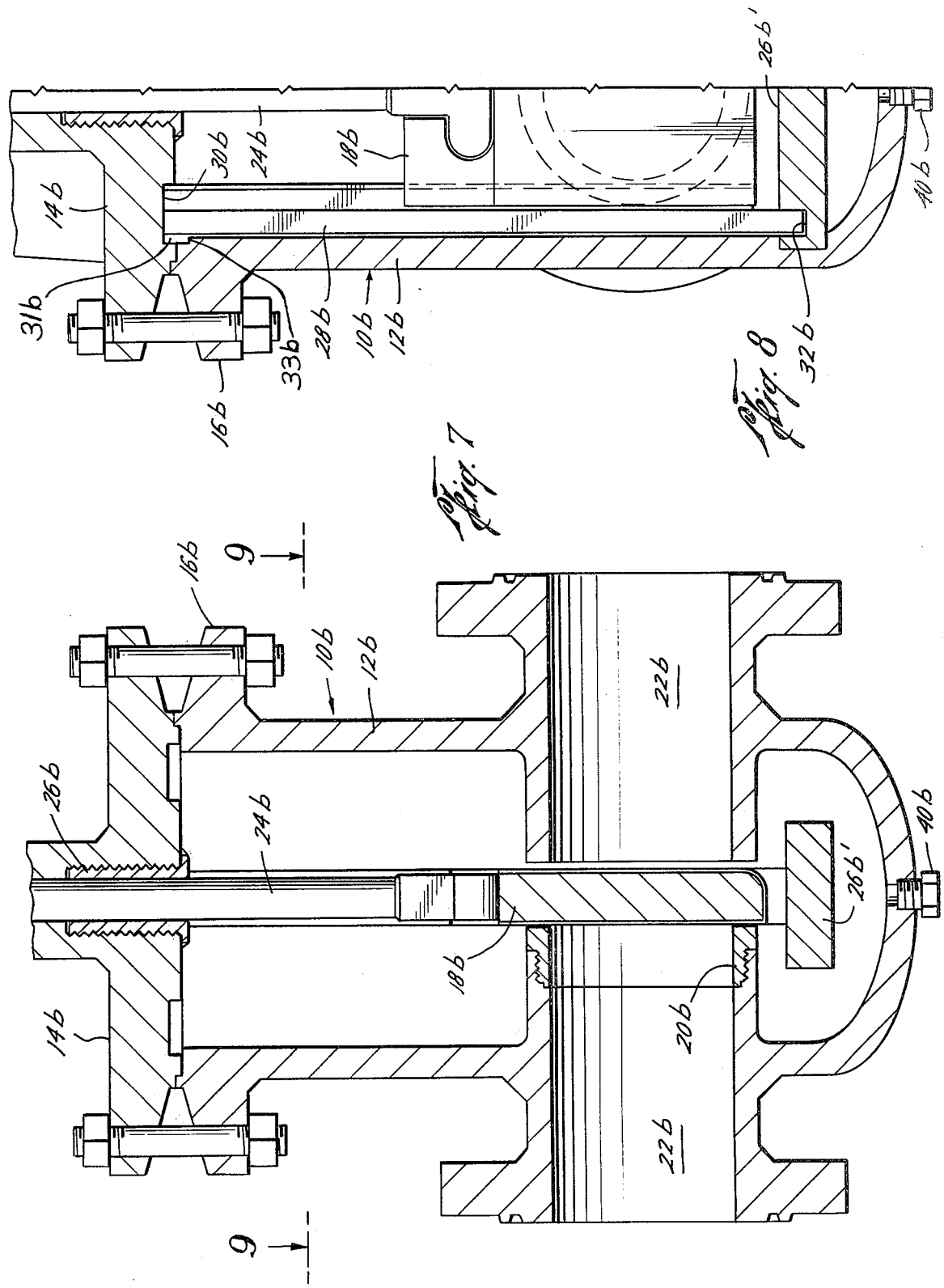

VALVE HAVING WEAR-PRONE PARTS REMOVABLE THROUGH BONNET AREA

BACKGROUND OF THE INVENTION

In refineries and solids handling systems, there is a need for a slide valve and a wedge valve in which the wear-prone parts can readily and easily be removed through the bonnet area for repair and replacement. The following U.S. patents disclose valves with removable internals: U.S. Pat. Nos. 3,964,507 and 3,726,306. However, the structures illustrated and the means of securing the guides and valve seats in these patents are different in that in the present invention no bolting of the guides is required and the guides and valve are retained in position simply by securing the bonnet to the body and are released for removal by removing the bonnet.

SUMMARY OF THE INVENTION

The present invention is directed to slide and wedge valves in which the wear-prone parts of the valve are readily and easily released for removal through the bonnet area simply by removing the bonnet and the valve guides are retained in position by securing the bonnet to the body.

Accordingly, it is an object of the present invention to provide a slide valve and a wedge valve in which wear-prone parts are readily removable through the bonnet area simply by removing the bonnet.

It is a further object of the present invention to provide slide and wedge valves in which the guides which guide the slide and wedge valves into open and closed position are maintained in their position in the body seating in interfitting portions in a stop in the body and in the bonnet so that the guides are held in position simply by securing the bonnet to the valve, and are released for removal by removing the bonnet.

It is a further object of the invention to provide slide and wedge valves in which it is unnecessary to bolt the guides which guide the valves to the valve body.

A further object of the present invention is the provision of slide and wedge valves in which wear-prone parts are readily and easily removable through the bonnet area, the wear-prone parts consisting of the slide or wedge valve, the guides, and the valve seat, and in which it is unnecessary to bolt the guides and valve seat in the body to maintain them in position.

A further object of the present invention is the provision of such valves which can be hardfaced or refractory lined readily and easily.

Other and further objects, features and advantages of the invention will be apparent from the following description of presently preferred embodiments thereof given for the purpose of disclosure when taken in conjunction with accompanying drawings.

BRIEF DESCRIPTION OF THE DRAWINGS

FIG. 1 is a partial elevational view, in section, of a valve according to the invention.

FIG. 2 is a side view, partly in section, of the valve of FIG. 1.

FIG. 3 is an enlarged cross-sectional view taken along the line 3—3 of FIG. 1.

FIG. 4 is a partial elevational view, in section, of another embodiment of a valve according to the invention.

FIG. 5 is a side, quarter-sectional view of the valve illustrated in FIG. 4.

FIG. 6 is a cross-sectional view taken along the line 6—6 of FIG. 4.

FIG. 7 is a partial elevational view, in section, of another embodiment of the valve according to the invention.

FIG. 8 is a side, quarter-sectional view of the valve illustrated in FIG. 7.

FIG. 9 is a cross-sectional view taken along the line 9—9 of FIG. 7.

DESCRIPTION OF THE PRESENTLY PREFERRED EMBODIMENTS

Referring now to the drawings, and particularly to FIGS. 1 and 2, the reference numeral 10 generally designates a slide valve which includes the valve body 12, here shown as being elliposidal in cross-sectional shape, which has the opening 11 closed by the flanged bonnet or cover 14 bolted to the end body flange 16. The bonnet or cover 14 releasably closes the opening 11 in the end of the body 12, which opening 11 is of a size large enough to insert in and withdraw from the valve body 12 wear-prone components when the bonnet or cover 14 is removed.

Disposed within the valve body 12 is a slide valve 18 and a valve seat 20 releasably secured to and forming a continuation of the flow passage 22 extending through the valve body 12. It is noted that the valve seat 20 is not bolted to the body 12, but it is simply a tight fit which maintains it in position as a continuation of the flow passage 22.

While any suitable means may be provided for sliding the slide valve 18 into open or closed position, an actuator stem 24 is secured to the slide valve 18 and extends through the stuffing box 26 in the bonnet or cover 14. Any suitable means may be provided for sliding the slide valve 18 into open and closed position; however, for refinery and other commercial operations, valves of the type of the present invention are opened and closed remotely as part of the valve system, which would include hydraulic or pneumatic actuating means to move the actuator stem 24 although manual means, not shown, may be used for this purpose.

No more description is given or deemed necessary of the means for opening and closing the slide valve 18 and the stuffing box 26, as any desired means may be utilized, manual, hydraulic, pneumatic and the like, to open and close the valve.

A pair of transversely spaced guides 28 are provided on opposite sides of the slide valve 18, which guides extend from the bonnet 14 beyond the flow passage 22 and valve seat 20 to the internal stop 26' on the other side of the flow passage 22, which is here shown as the other end of the body 12. As best illustrated in FIG. 2, the guides 24 (only one being shown in this view) fit into recessed portions 30 of the bonnet 14 and recessed portions 32 of the stop 26' which maintain them in position without being bolted to the body. If desired, and as seen in FIG. 3, the outer portions of the guides 28 can engage the internal walls 34 of the body 12 to assist in maintaining them in position, although the guides can be spaced from the internal walls 34. If desired, the outer surfaces 29 of the guides 28 can be shaped to conform to the configuration of the internal walls 34 such as the embodiments illustrated in FIGS. 6 and 9 described subsequently or they can simply have their edges engage the internal walls 34 as illustrated in FIG.

3 or be spaced therefrom, as previously mentioned. The guides, however, are located out of the flow path through the flow passage 22 to minimize wear.

As best illustrated in FIG. 3, the slide valve 18 and the guides 28 have interfitting tongues and grooves 36 and 38 to guide the slide valve in its sliding movement into closed and open position. In the embodiment illustrated in FIG. 3, the tongue 36 is illustrated on the slide valve 18 and the grooves 38 are illustrated in the guides 28; however, these can be reversed, for example, as illustrated in FIGS. 6 and 9 subsequently described.

The valve illustrated in FIGS. 1, 2 and 3 is refractory lined, such as the refractory material 40 and 42 on the slide valve 18 although it can be hardsurfaced as described subsequently, if so desired.

The body may take any desired shape and insulation 42 may be of any desired type, such as formed of hex-mesh and refractory material, many of which are commercially available such as Resco RA-22 and a castable insulation, such as Resco RS-7. Also, if desired, instead of refractory material the valve and valve seat can be lined by a suitable hardfacing material, as can be the guides and slides, for example by Tapco 6.

Since any desired refractory material and lining or hardsurfacing can be used, all of which are readily available on the commercial market, no more description thereof is given or deemed necessary.

In the valve illustrated in FIGS. 1, 2 and 3, only one valve seat 20 is illustrated and a finite space is provided between the flow passage 22 on the right-hand side of FIG. 1, the flow and hence the pressure in the direction of the arrow firmly seating the slide valve against the refractory lined 42 valve seat 20 is illustrated. If desired, however, as in the case of the plug valve subsequently described, a valve seat can be placed on the right-hand side, although this is unnecessary.

Also, if desired, expansion members can be placed in one or more of the recessed portions 30 and 32 in which the ends of the guides 24 seat to accommodate thermal growth or as shown in FIGS. 5 and 8 stop ends of the guides are spaced from the bottoms of the recesses 22a and 22b to accomodate thermal growth.

The upper ends of the guides 28, 28a 28b (FIGS. 2, 5 and 8) have the extending portions 31, 31a and 31b which fit into the cooperating recessed portions 30, 30a and 30b in the bonnet 14, 14a and 14b and recessed portions 33, 33a and the 33b in the upper end of the body 12, 12a and 12b adjacent the opening 11, 11a and 11b so that the guides 28, 28a and 28b are maintained in position simply by securing the bonnet 14, 14a and 14b to the body 12, 12a and 12b, respectively.

In using the slide valve of FIGS. 1, 2 and 3 the valve is assembled by placing the valve seat 20 and refractory material in position, the guides 28 into position, and the slide valve 28 through the open bonnet area 11. The bonnet 14 is then secured to the body flange 16 which secures the guides 28 into position. The valve is then ready for use.

When it is necessary to make repairs or replace parts, the bonnet 14 is removed from the body flange 16, which thus releases the guides 28 which are removed, the slide valve is removed, and then the valve seat 20 and refractory lining 42 are removed. This is done rapidly and easily in view of the fact that it is unnecessary to bolt any of these internals to the body which avoids the time required in removing bolts, particularly in highly corrosive streams through the passage 22.

Referring now to FIGS. 4, 5 and 6, a wedge valve according to the invention is illustrated in which the reference letter "a" has been added to numerals designating corresponding parts to the slide valve illustrated in FIGS. 1, 2 and 3. As best seen in FIG. 6, the body 12a is here shown as cylindrical in cross section and as best illustrated in FIGS. 4 and 6, a wedge-type valve 18a is provided instead of the slide valve 18 of FIGS. 1, 2 and 3. As best illustrated in FIG. 6, the tongues and grooves of the guides and valve are reversed from that of FIGS. 1, 2 and 3, with the tongues 36a being disposed on the guides 28a and the grooves 38a disposed in the wedge valve 18a although these could be reversed as in the embodiment of FIGS. 1, 2 and 3.

Also, a pair of valve seats 20a are provided in the flow passage 22a against which the wedge valve 18a seats and, as here shown, the wear-prone portions are hardfaced or lined with hardfacing material although they could be lined with refractory insulation and material if desired. These are threaded into position; although, a non-threaded tight fit could be utilized if desired.

All other parts, mode of operation, assembly and disassembly are the same as set forth with respect to the embodiment of FIGS. 1, 2 and 3, the wedge valve internals being readily assembled through the bonnet area 11a, maintained in position by securing the bonnet 14a on the flange 16a, and the wear-prone internals released for ready removal simply by removing the bonnet 14a from the body 12a and unthreading the valve seats 20a.

A still further embodiment of the invention is illustrated in FIGS. 7, 8 and 9, in which the reference letter "b" has been added to numerals designating corresponding parts to the previous Figures, and to which reference is now made. The embodiment illustrated in these Figures is a slide valve which includes the slide valve 18b and the generally cylindrical, in cross-section, body 12b. In this embodiment, the slide valve is simply lined with a hardfacing material, the outer surfaces 29b of the guide 28b are shaped to conform to the shape of the inner surface 34b of the cylindrical body 10b and engage these internal surfaces to assist in giving support to the guides 28b although they can be spaced from these internal walls if so desired. Also, as in the embodiment illustrated in FIGS. 4, 5 and 6, the valve seat 20b is threaded into the projecting inner portion of the passage 22b; although, a non-threaded tight fit can be used when circumstances permit.

Thus, the slide valve of FIGS. 7, 8 and 9 is assembled and disassembled the same as described in connection with the embodiment of FIGS. 4, 5 and 6, it only being necessary to unscrew the valve seat 20b from the embodiment illustrated in FIGS. 1, 2 and 3. Accordingly, no further description of the embodiment of FIGS. 7, 8 and 9 is given or deemed necessary.

As previously mentioned, the body of the valve may take any desired shape, suitable seals (not shown) and drain plugs, one being shown and designated by the reference numeral 40 in FIGS. 1 and 2, 40a in FIGS. 4 and 5 and 40b in FIGS. 7 and 8 are provided.

The present invention therefore provides valves in which the wear-prone internals can be removed simply and quickly through the bonnet area and the guides for the slide valve are maintained in place simply by securing bonnet over the bonnet end of the body. Accordingly, the present invention attains the objects and ends and has the advantages and features mentioned as well as others inherent therein.

While presently preferred embodiments of the invention have been given for the purposes of disclosure, changes can be made in these embodiments which are within the spirit of the invention as defined by the scope of the appended claims.

What is claimed is:

1. A valve having wear-prone parts removable through its bonnet area comprising, a body having an opening at one end, a stop spaced from the one end, and a flow passage extending through the body between the one end and the stop, at least one valve seat releasably disposed in the body and forming a portion of the flow passage, a valve movable in the body arranged to move across the flow passage and to seat on the valve seat for closing the valve and to move out of the flow passage for opening the valve, a pair of elongated guides in the flow passage, one each disposed on each side of the valve and extending lengthwise in the direction of movement of the valve, the guides disposed to be freely movable with respect to internal walls of the flow passage, slides on the valve cooperating with the guides, the guides and slides operable to guide the valve into the open and closed positions, and a bonnet releasably secured to the body and closing the opening, the opening being of a size permitting insertion of and the withdrawal from the body of the guides, the slide valve, and the valve seat, the bonnet end and the stop end having recessed portions into which ends of the guides project operable to maintain the guides in operating position while the guides are free to move with respect to the internal walls of the flow passage to allow for thermal expansion of the guides.

the guides the slides, the valve and at least the one valve seat being released for removal from the body by removing the bonnet.

2. The valve of claim 1 where,
the valve is a slide valve.

3. The valve of claims 1 or 2 where,
the valve is a wedge valve, and includes a pair of valve seats, one on each side of the wedge valve against which the wedge valve seats.

4. The valve of claims 1 or 2 where,
outer surfaces of the guides are correspondingly shaped to the internal walls, and
the outer surfaces engage the internal walls.

5. The valve of claims 1 or 2 where,
at least the valve is lined with refractory material.

6. The valve of claims 1 or 2, including,
an actuator stem extending through the bonnet for moving the valve to the open and closed positions.

7. A valve having wear-prone parts removable through its bonnet area comprising, a body having an opening at one end, a stop spaced from the one end, and a flow passage extending through the body between the one end and the stop, at least one valve seat releasably disposed in the body and forming a portion of the flow passage, a valve movable in the body arranged to move across the flow passage and to seat on the valve seat for closing the valve and to move out of the flow passage for opening the valve, a pair of elongate guides in the flow passage, one each disposed on each side of the valve and extending lengthwise in the direction of movement of the valve, the guides being disposed in the flow passage to be freely movable with respect to internal walls of the flow passage to allow for thermal expansion of the guides, slides on the valve cooperating with the guides, the guides and slides operable to guide the valve into the open and closed positions, a bonnet releasably secured to the body and closing the opening, the opening being of a size permitting insertion of and the withdrawal from the body of the guides, the slide valve, and the valve seat, projections extending from bonnet and stop ends of the guides, and recessed portions in the stop into which the stop ends of the guides project when the guides are in said position, coacting recessed portions in the bonnet and the body adjacent the opening into which the bonnet ends and the projections fit, securing of the bonnet to the body operable to maintain the guides in position by clamping the bonnet ends and the stop ends in the recessed portion the guides, the slides, the valve and at least one valve seat being released for removal from the body by removing the bonnet.

8. The valve of claim 7 where,
the valve is a slide valve.

9. The valve of claims 7 or 8 where,
the valve is a wedge valve, and include
a pair of valve seats, one on each side of the wedge valve, against which the wedge valve seats.

10. The valve of claims 7 or 8 where,
outer surfaces of the guides are correspondingly shaped to the internal walls, and
the outer surfaces engage the internal walls.

11. The valve of claims 7 or 8 where,
at least the valve is lined with refractory material.

12. The valve of claims 7 or 8, including,
an actuator stem extending through the bonnet for moving the valve to the open and closed positions.

* * * * *